United States Patent
Nagamine

(10) Patent No.: US 11,443,496 B2
(45) Date of Patent: Sep. 13, 2022

(54) THREE-DIMENSIONAL OBJECT DATA GENERATION APPARATUS, THREE-DIMENSIONAL OBJECT FORMING APPARATUS, AND NON-TRANSITORY COMPUTER READABLE MEDIUM FOR SETTING ATTRIBUTES OF VOXELS REPRESENTING OBJECT

(71) Applicant: FUJIFILM BUSINESS INNOVATION CORP., Tokyo (JP)

(72) Inventor: Takeshi Nagamine, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 171 days.

(21) Appl. No.: 16/589,182

(22) Filed: Oct. 1, 2019

(65) Prior Publication Data
US 2020/0118348 A1    Apr. 16, 2020

(30) Foreign Application Priority Data

Oct. 15, 2018    (JP) .............................. JP2018-194494

(51) Int. Cl.
*G06T 19/20*    (2011.01)
*G06T 15/08*    (2011.01)
*B33Y 50/00*    (2015.01)

(52) U.S. Cl.
CPC .............. *G06T 19/20* (2013.01); *B33Y 50/00* (2014.12); *G06T 15/08* (2013.01); *G06T 2200/04* (2013.01); *G06T 2219/2008* (2013.01)

(58) Field of Classification Search
None
See application file for complete search history.

(56) References Cited

U.S. PATENT DOCUMENTS

| 10,210,671 | B2 | 2/2019 | Takahashi |
| 2017/0372527 | A1* | 12/2017 | Murali ...................... G06T 7/38 |

FOREIGN PATENT DOCUMENTS

| JP | 2017-148976 A | 8/2017 |
| JP | 2018-34421 A | 3/2018 |
| JP | 2018-67128 A | 4/2018 |

OTHER PUBLICATIONS

Jun. 28, 2022 Office Action issued in Japanese Patent Application No. 2018-194494.

* cited by examiner

*Primary Examiner* — Vu Nguyen
(74) *Attorney, Agent, or Firm* — Oliff PLC

(57) ABSTRACT

A three-dimensional object data generation apparatus includes an attribute setting unit that sets, for each of plural voxels representing a three-dimensional object, an attribute of a voxel of a second three-dimensional object, which is obtained by combining plural first three-dimensional objects together, in accordance with a priority level set for an attribute of a voxel at a time when the plural first three-dimensional objects are combined together.

8 Claims, 13 Drawing Sheets

THREE-DIMENSIONAL OBJECT DATA GENERATION APPARATUS, THREE-DIMENSIONAL OBJECT FORMING APPARATUS, AND NON-TRANSITORY COMPUTER READABLE MEDIUM FOR SETTING ATTRIBUTES OF VOXELS REPRESENTING OBJECT

CROSS-REFERENCE TO RELATED APPLICATION

This application is based on and claims priority under 35 USC 119 from Japanese Patent Application No. 2018-194494 filed Oct. 15, 2018.

BACKGROUND

(i) Technical Field

The present disclosure relates to a three-dimensional object data generation apparatus, a three-dimensional object forming apparatus, and a non-transitory computer readable medium.

(ii) Related Art

Japanese Unexamined Patent Application Publication No. 2018-67128 discloses a three-dimensional object data editing apparatus including a range setting unit that sets either a protection target range or an editable range of a three-dimensional object represented by three-dimensional object data including three-dimensional positional information as an edit control range and a control condition setting unit that, when editing is performed in the editable range, sets a control condition for controlling the editing in the editable range so that editing is not performed in the protection target range.

SUMMARY

When a three-dimensional object is designed, three-dimensional objects of a plurality of components might be combined together. In this case, so-called "Boolean operations" are employed to calculate the sum, product, and remainder of the three-dimensional objects of the plurality of components.

Aspects of non-limiting embodiments of the present disclosure relate to a three-dimensional object data generation apparatus, a three-dimensional object forming apparatus, and a non-transitory computer readable medium capable of, when a plurality of three-dimensional objects represented by voxels are combined together, sparing the user from setting one by one attributes of voxels after the plurality of three-dimensional objects are combined together.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a three-dimensional object data generation apparatus including an attribute setting unit that sets, for each of a plurality of voxels representing a three-dimensional object, an attribute of a voxel of a second three-dimensional object, which is obtained by combining a plurality of first three-dimensional objects together, in accordance with a priority level set for an attribute of a voxel at a time when the plurality of first three-dimensional objects are combined together.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described hereinafter with reference to the drawings.

Figure 1:
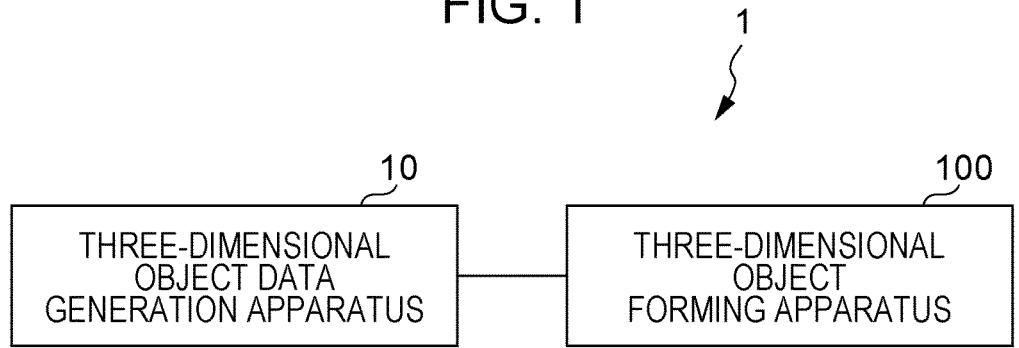
FIG. 1 is a diagram illustrating the configuration of a three-dimensional object forming system.

FIG. 1 is a diagram illustrating the configuration of a three-dimensional object forming system 1 according to the present exemplary embodiment. As illustrated in FIG. 1, the three-dimensional object forming system 1 includes a three-dimensional object data generation apparatus 10 and a three-dimensional object forming apparatus 100.

Figure 2:
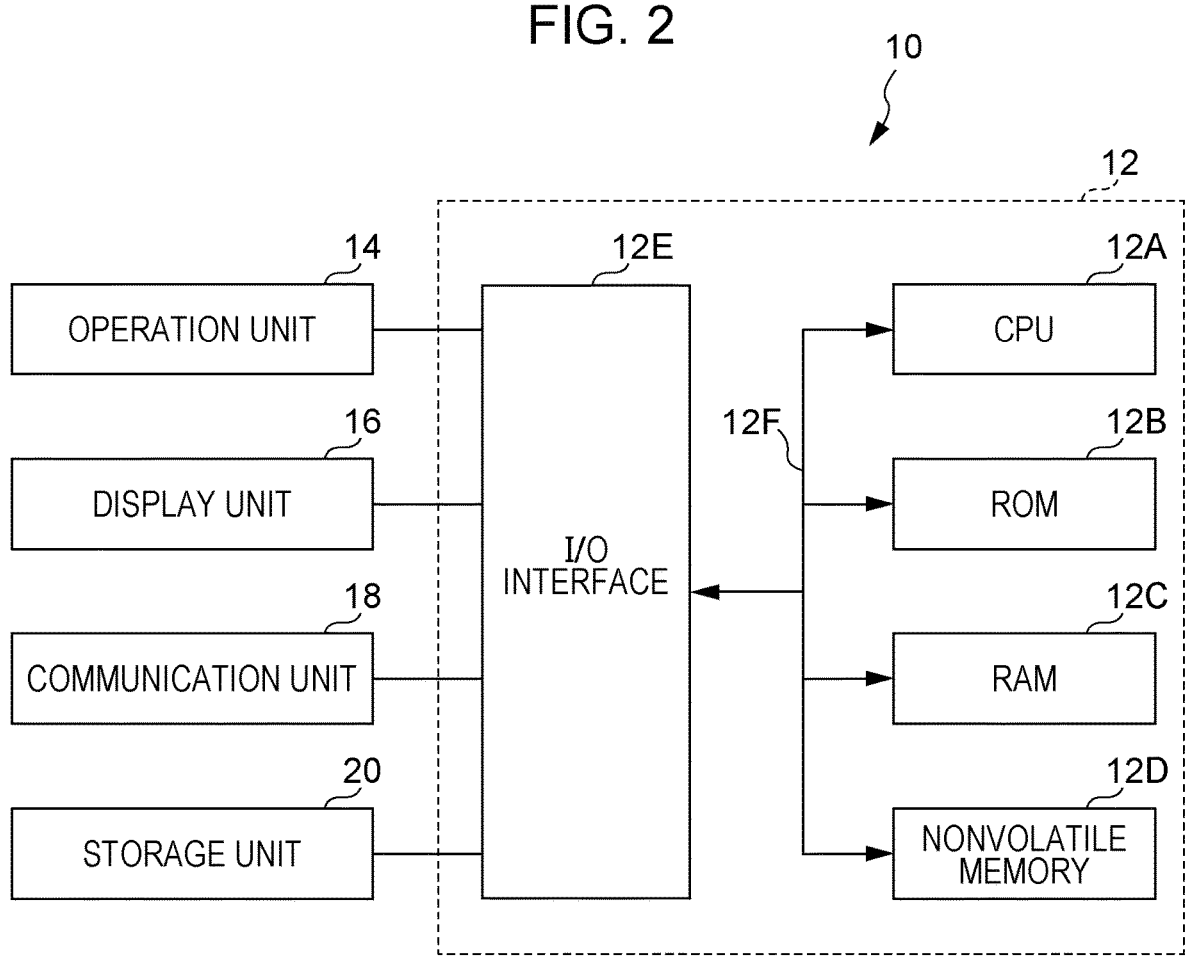
FIG. 2 is a diagram illustrating the hardware configuration of a three-dimensional object data generation apparatus.

Next, the configuration of the three-dimensional object data generation apparatus 10 according to the present exemplary embodiment will be described with reference to FIG. 2.

The three-dimensional object data generation apparatus 10 is a personal computer, for example, and includes a controller 12. The controller 12 includes a central processing unit (CPU) 12A, a read-only memory (ROM) 12B, a random-access memory (RAM) 12C, a nonvolatile memory 12D, and an input/output (I/O) interface 12E. The CPU 12A, the ROM 12B, the RAM 12C, the nonvolatile memory 12D, and the I/O interface 12E are connected to one another through a bus 12F.

An operation unit 14, a display unit 16, a communication unit 18, and a storage unit 20 are connected to the I/O interface 12E.

The operation unit 14 includes, for example, a mouse and a keyboard.

The display unit 16 is, for example, a liquid crystal display.

The communication unit 18 is an interface for communicating data with external apparatuses such as the three-dimensional object forming apparatus 100.

The storage unit 20 is a nonvolatile storage device such as a hard disk and stores a program for generating three-dimensional object data, which will be described later, three-dimensional object data (voxel data) regarding a three-dimensional object, and the like. The CPU 12A reads the program for generating three-dimensional object data stored in the storage unit 20 and executes the program.

Next, the functional configuration of the CPU 12A will be described.

Figure 3:
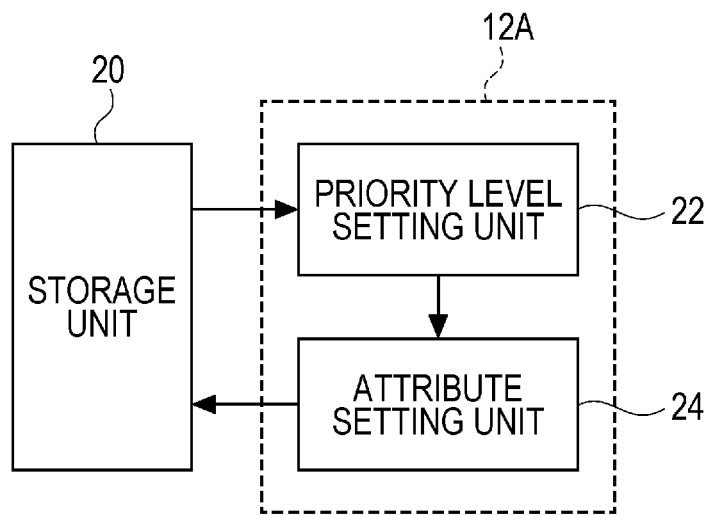
FIG. 3 is a block diagram illustrating the functional configuration of the three-dimensional object data generation apparatus.

As illustrated in FIG. 3, the CPU 12A includes a priority level setting unit 22 and an attribute setting unit 24 in terms of functions.

The priority level setting unit 22 sets, for each of a plurality of voxels representing a three-dimensional object, a priority level relating to an attribute of the voxel at a time when a plurality of first three-dimensional objects are combined together. The plurality of first three-dimensional objects represent, for example, a plurality of components of a second three-dimensional object. The priority level setting unit 22 is an example of a first priority level setting unit and a second priority level setting unit.

The attribute setting unit 24 sets, in accordance with the priority levels set by the priority level setting unit 22, attributes of voxels of the second three-dimensional object obtained by combining the plurality of first three-dimensional objects together. The priority level relating to each voxel at a time when the plurality of first three-dimensional objects are combined together may be set in advance. For example, operators who form the plurality of first three-dimensional objects may set the priority levels in advance, or an operator who forms the second three-dimensional object may set the priority levels in advance.

Figure 4:
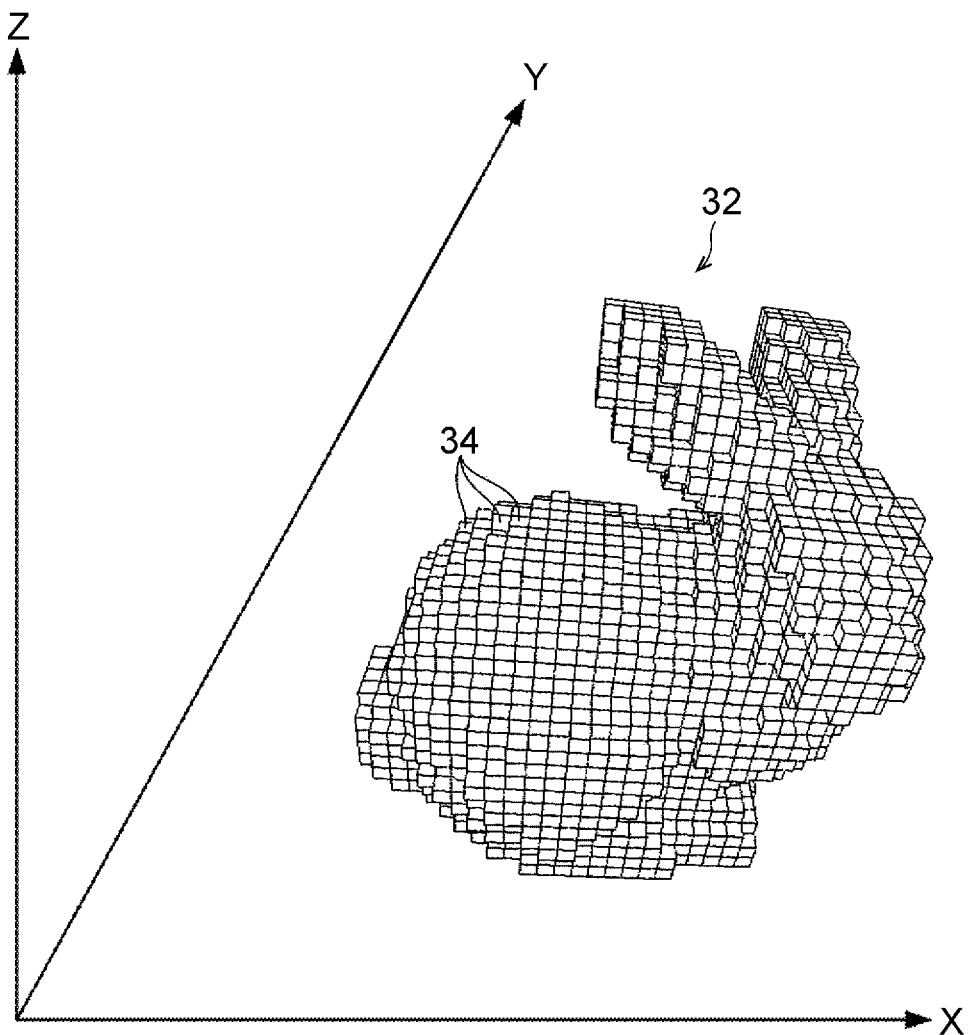
FIG. 4 is a diagram illustrating an example of a three-dimensional object represented by voxel data.

FIG. 4 illustrates a three-dimensional object 32 represented by three-dimensional object data (voxel data), which is a group of voxels. As illustrated in FIG. 4, the three-dimensional object 32 includes a plurality of voxels 34.

The voxels 34 are basic elements of the three-dimensional object 32. The voxels 34 may be rectangular parallelepipeds, for example, but may be spheres or cylinders, instead. A desired three-dimensional object is represented by stacking the voxels 34 on one another.

Attributes are set for each voxel. The attributes include at least one attribute indicating a property of each voxel, such as color, intensity, material, or texture. Types of attribute, however, are not limited to these.

As a method for forming a three-dimensional object, for example, fused deposition modeling (FDM), in which a thermoplastic resin is plasticized and stacked to form a three-dimensional object, or selective laser sintering (SLS), in which a laser beam is radiated onto a powdery metal material to form a three-dimensional object through sintering, is used, but another method may be used, instead. In the present exemplary embodiment, a case where a three-dimensional object is formed using FDM will be described.

Next, a three-dimensional object forming apparatus that forms a three-dimensional object using three-dimensional object data generated by the three-dimensional object data generation apparatus 10 will be described.

Figure 5:
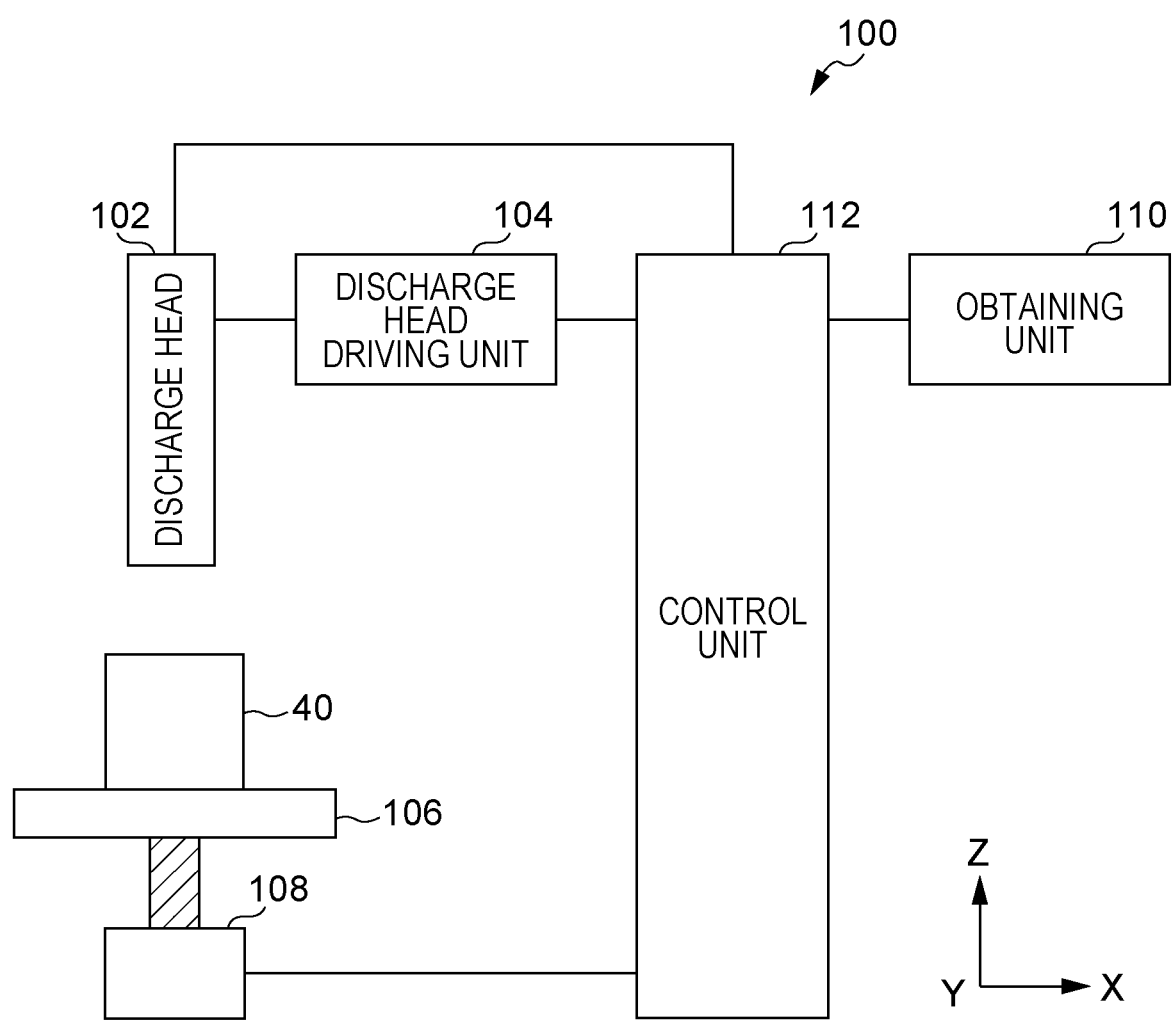
FIG. 5 is a diagram illustrating the configuration of a three-dimensional object forming apparatus.

FIG. 5 illustrates the configuration of the three-dimensional object forming apparatus 100 according to the present exemplary embodiment. The three-dimensional object forming apparatus 100 forms a three-dimensional object using FDM.

As illustrated in FIG. 5, the three-dimensional object forming apparatus 100 includes a discharge head 102, a discharge head driving unit 104, a stand 106, a stand driving unit 108, an obtaining unit 110, and a control unit 112. The discharge head 102, the discharge head driving unit 104, the stand 106, and the stand driving unit 108 are an example of a forming unit.

The discharge head 102 includes an object material discharge head that discharges an object material for forming a three-dimensional object 40 and a support material discharge head that discharges a support material. The support material is used to support overhangs (also referred to as "projections") of the three-dimensional object 40 and removed after the three-dimensional object 40 is formed.

The discharge head 102 is driven by the discharge head driving unit 104 and moves on an X-Y plane in two dimensions. The object material discharge head may include a plurality of discharge heads corresponding to object materials of a plurality of attributes (e.g., colors).

The stand 106 is driven by the stand driving unit 108 and moves along a Z axis.

The obtaining unit 110 obtains three-dimensional object data and support material data generated by the three-dimensional object data generation apparatus 10.

The control unit 112 drives the discharge head driving unit 104 to move the discharge head 102 in two dimensions and controls the discharge of the object material and the support material performed by the discharge head 102 such that the object material is discharged in accordance with the three-dimensional object data obtained by the obtaining unit 110 and the support material is discharged in accordance with the support material data obtained by the obtaining unit 110.

Each time a layer has been formed, the control unit 112 drives the stand driving unit 108 to lower the stand 106 by a predetermined layer interval. As a result, a three-dimensional object based on three-dimensional object data is formed.

Figure 6:
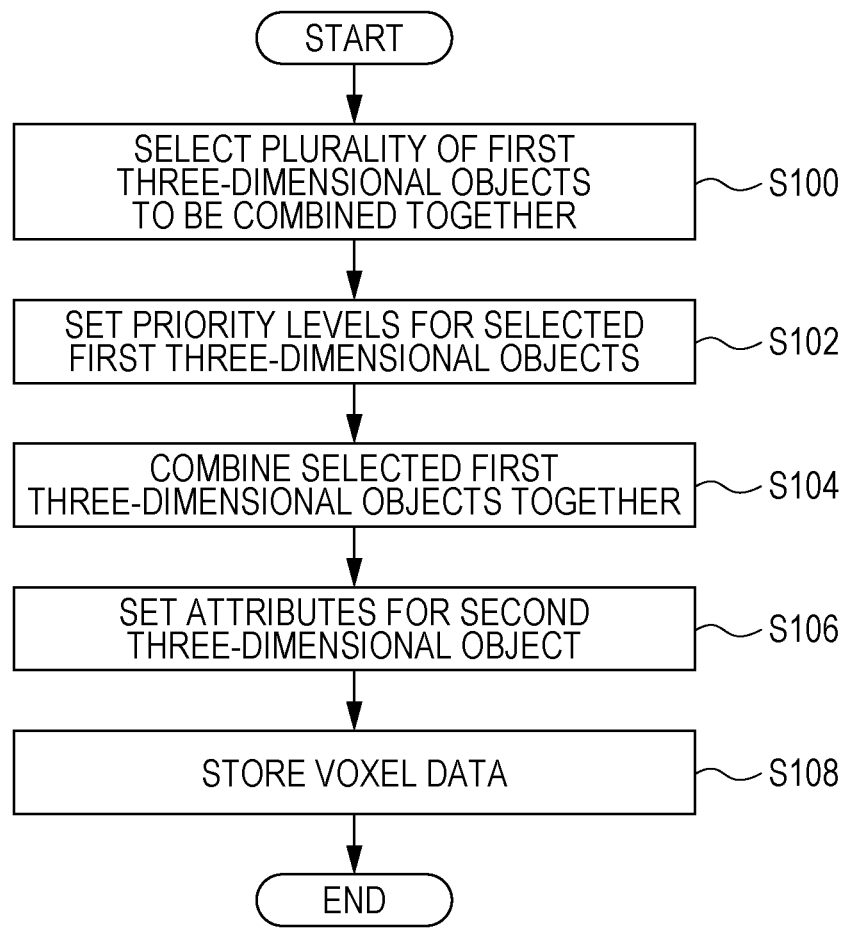
FIG. 6 is a flowchart illustrating a process achieved by a program for generating three-dimensional object data.

Next, the operation of the three-dimensional object data generation apparatus 10 according to the present exemplary embodiment will be described with reference to FIG. 6. A generation process illustrated in FIG. 6 is performed by causing the CPU 12A to execute a program for generating three-dimensional object data. The generation process illustrated in FIG. 6 is performed, for example, when a user has requested execution of the program. In the present exemplary embodiment, description of a process for generating support material data is omitted.

In step S100, the user is asked to select a plurality of first three-dimensional objects to be combined together. For example, three-dimensional object data regarding various first three-dimensional objects is stored in the storage unit 20 in advance. The three-dimensional object data regarding the various first three-dimensional objects is read from the storage unit 20, and the various first three-dimensional objects are displayed on the display unit 16. The user selects a plurality of first three-dimensional objects to be combined together from the first three-dimensional objects displayed on the display unit 16.

Figure 7:
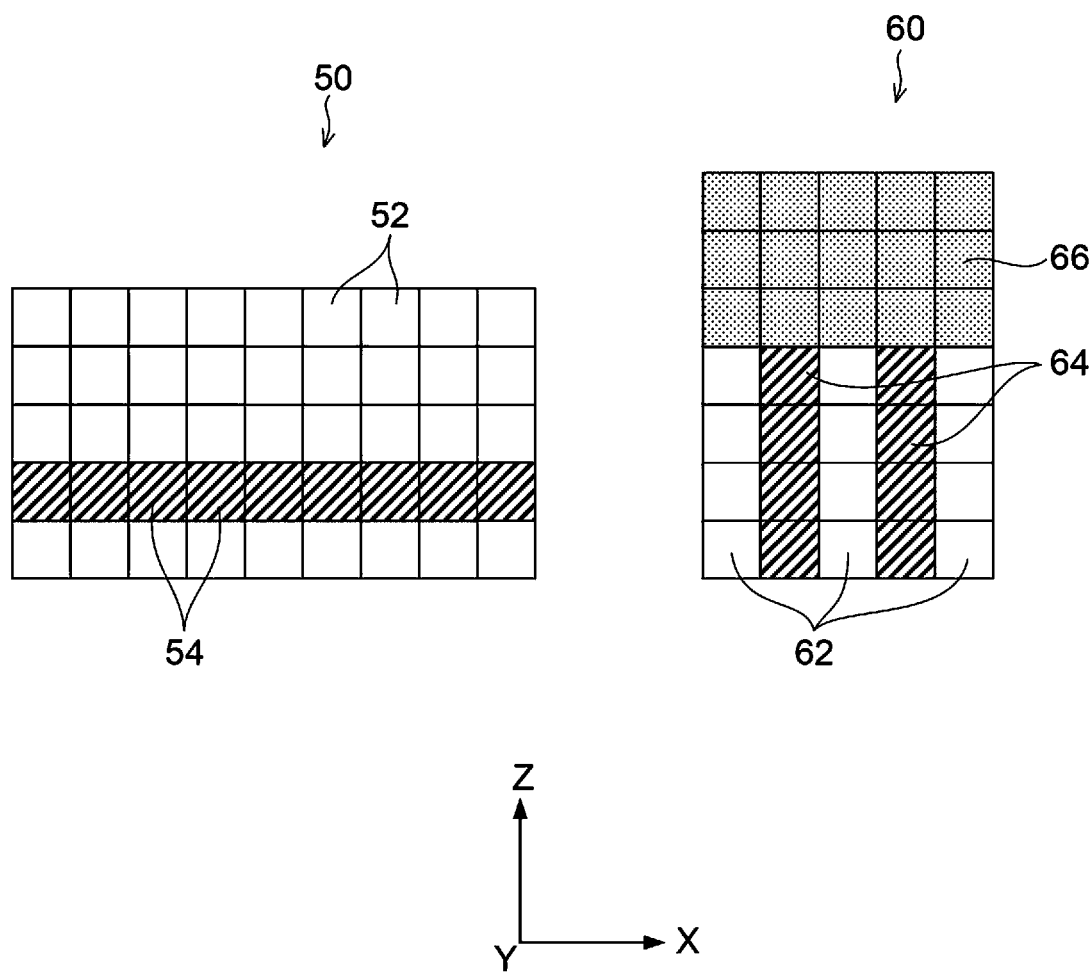
FIG. 7 is a diagram illustrating an example of a plurality of first three-dimensional objects.

In the present exemplary embodiment, a case will be described where, as illustrated in FIG. 7, for example, a first three-dimensional object 50 indicating a circuit board and a first three-dimensional object 60 indicating a light-emitting diode (LED) are selected and combined together. In FIG. 7, the first three-dimensional objects 50 and 60 are viewed on an X-Z plane in order to simplify description.

The first three-dimensional object 50 is a circuit board and includes voxels 52 and 54 for which two different materials are set as attributes. An insulator, which is a type of material, is set for the voxels 52 as an attribute, and a conductor, which is another type of material, is set for the voxels 54 as an attribute.

The first three-dimensional object 60 indicates an LED and includes voxels 62, 64, and 66 for which three different materials are set as attributes. An insulator, which is a type of material, is set for the voxels 62 as an attribute. A conductor, which is another type of material, is set for the voxels 64 as an attribute. A light-emitting member, which is another type of material, is set for the voxels 66 as an attribute.

In this case, in order to turn on the LED, the conductor of the LED and the conductor of the circuit board need to be connected to each other. When the first three-dimensional objects 50 and 60 are combined together, an overlap is caused. How to set attributes of voxels in the overlap, therefore, need to be determined. More specifically, when the first three-dimensional objects 50 and 60 are combined together to obtain a second three-dimensional object, it has not been determined which of the attributes of the first three-dimensional object 50 and the attributes of the first three-dimensional object 60 are to be employed as attributes of voxels in an overlap between the first three-dimensional objects 50 and 60. In the present exemplary embodiment, the first three-dimensional objects 50 and 60 are combined together with coordinate positions and sizes of voxels of the first three-dimensional objects 50 and 60 in the overlap at least matched in a certain space. In another case, however, the first three-dimensional objects 50 and 60 may be combined together without the coordinate positions and the sizes of the voxels in the overlap matched in a certain space. In this case, attributes of the voxels of the first three-dimensional object 50 or the first three-dimensional object 60 may be used as at least either coordinate positions or sizes of the voxels, or an average of the attributes of the voxels of the first three-dimensional objects 50 and 60 may be used.

Figure 8:
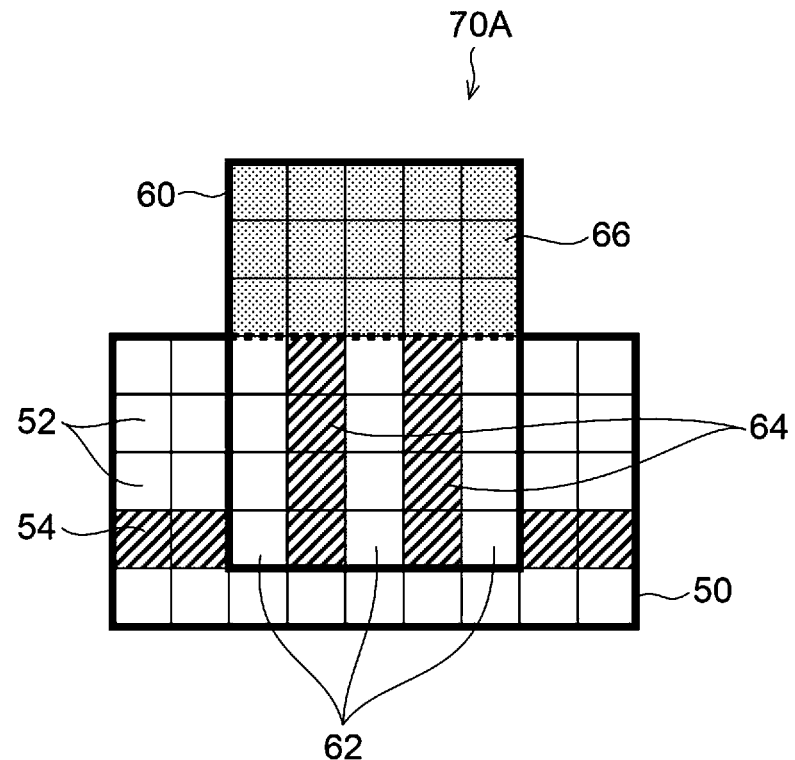
FIG. 8 is a diagram illustrating an example of a second three-dimensional object obtained by combining the plurality of first three-dimensional objects together.
Figure 9:
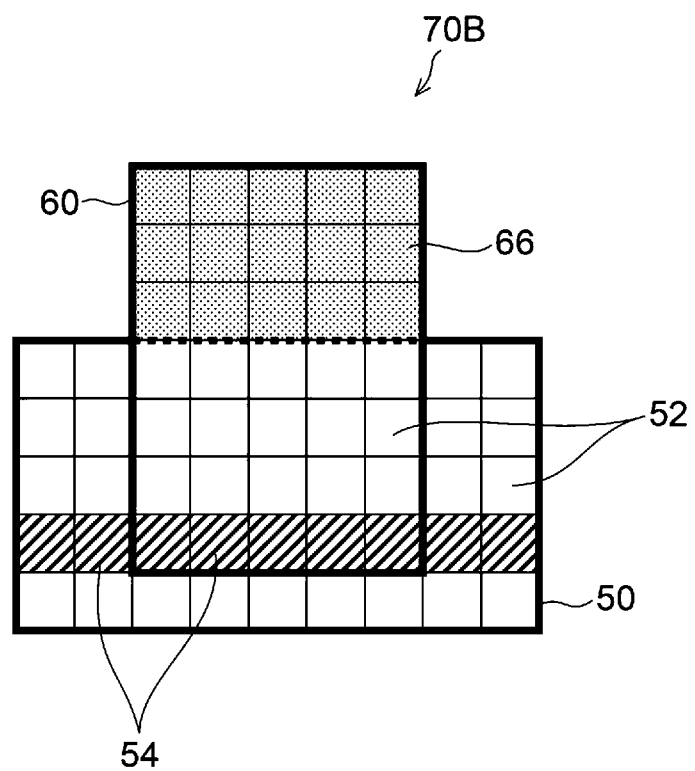
FIG. 9 is a diagram illustrating another example of the second three-dimensional object obtained by combining the plurality of first three-dimensional objects together.

FIG. 8 illustrates a second three-dimensional object 70A in which attributes of voxels in an overlap have been set while giving priority to the attributes set for the voxels 62, 64, and 66 of the first three-dimensional object 60. FIG. 9 illustrates a second three-dimensional object 70B in which the attributes of the voxels in the overlap have been set while giving priority to the attributes set for the voxels 52 and 54 of the first three-dimensional object 50.

As illustrated in FIG. 8, if the attributes of the voxels in the overlap are set while giving priority to the attributes set for the voxels 62, 64, and 66 of the first three-dimensional object 60, the voxels 54 indicating the conductor of the first three-dimensional object 50 and the voxels 64 indicating the conductor of the first three-dimensional object 60 are not connected to each other. It is therefore difficult for the second three-dimensional object 70A to turn on the LED since the conductor of the LED is not conductive to the conductor of the circuit board.

As illustrated in FIG. 9, on the other hand, if the attributes of the voxels in the overlap are set while giving priority to the attributes set for the voxels 52 and 54 of the first three-dimensional object 50, the voxels 64 indicating the conductor of the first three-dimensional object 60 disappear. It is therefore difficult for the second three-dimensional object 70B, too, to turn on the LED.

In step S102, priority levels relating to attributes of voxels at a time when the first three-dimensional objects 50 and 60 selected in step S100 are combined together are set for the voxels of the first three-dimensional objects 50 and 60. For example, the user operates the operation unit 14 to set the priority levels for the voxels of the first three-dimensional objects 50 and 60. If the priority levels have already been set for the voxels, step S102 may be omitted.

Alternatively, a single priority level may be set for all voxels of a first three-dimensional object. If the user selects one of a plurality of first three-dimensional objects and selects a priority level for a voxel of the first three-dimensional object, for example, the selected priority level may also be set for all of other voxels of the first three-dimensional object selected from the plurality of first three-dimensional objects. Alternatively, the user may specify a range for a first three-dimensional object, and a priority level set by the user may be uniformly set for all voxels in the specified range. As a result, it becomes easier for the user to set priority levels.

If priority levels of 1 to 5 are used, for example, one of the priority levels may be set as an absolute priority level. In addition, a priority level of A or B, for example, may be set as a relative priority level. If the priority level of A is set, for example, an attribute of a first three-dimensional object having a higher priority level may take priority. If the priority level of B is set, on the other hand, a first three-dimensional object having a lower priority level may take priority.

Figure 10:
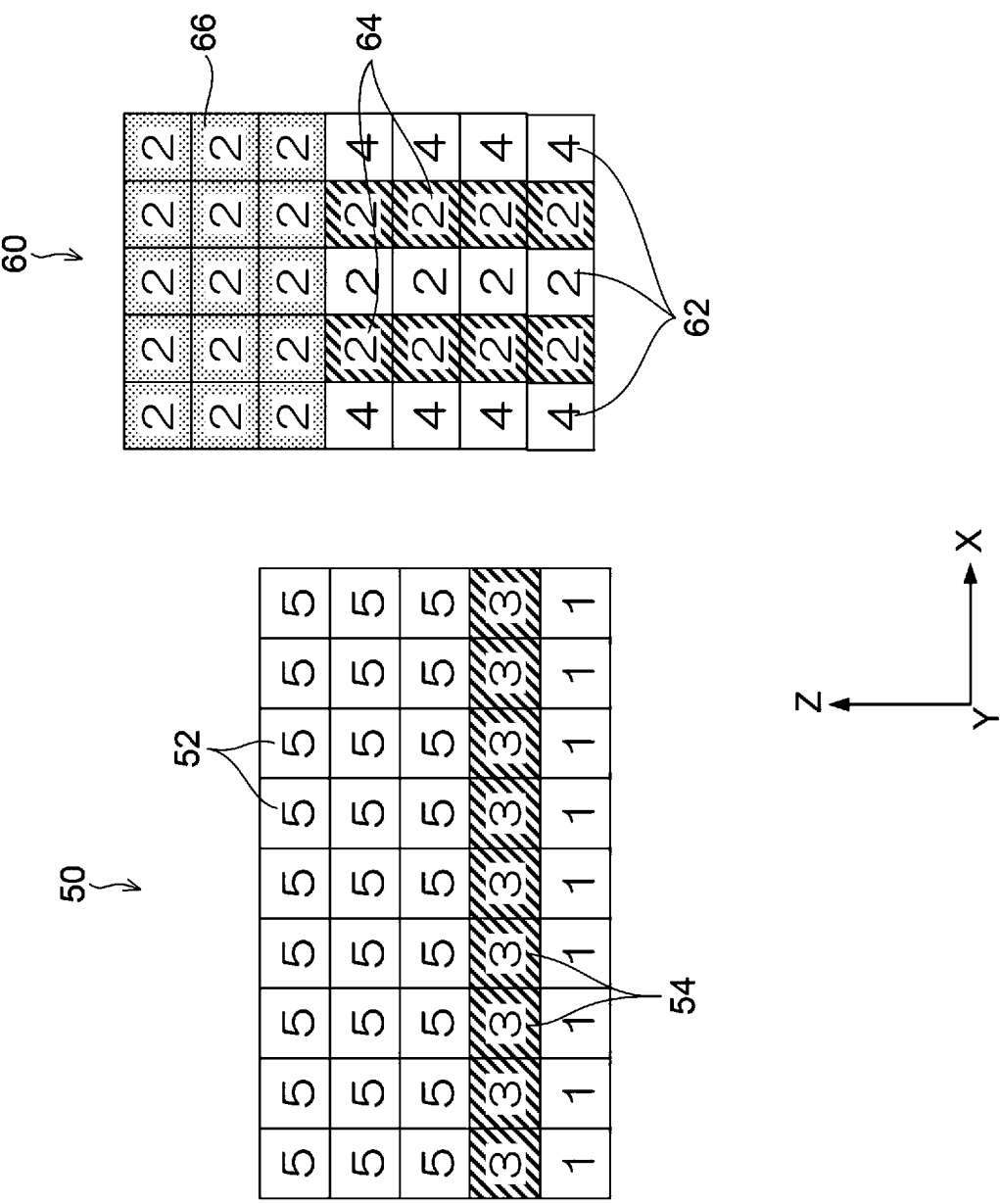
FIG. 10 is a diagram illustrating an example of priority levels set for voxels of the plurality of first three-dimensional objects.

FIG. 10 illustrates an example of priority levels set for the voxels of the first three-dimensional objects 50 and 60. Values in the voxels are the priority levels. In the example illustrated in FIG. 10, the priority levels of 1 to 5 are set, and smaller values indicate higher priority levels. That is, the priority level of 1 is a highest priority level, and the priority level of 5 is a lowest priority level. Although five different priority levels are used in the example illustrated in FIG. 10, the number of priority levels is not limited to this.

In the example illustrated in FIG. 10, priority levels of the voxels 54 indicating the conductor of the first three-dimensional object 50 and the voxels 64 indicating the conductor of the first three-dimensional object 60 are set such that the conductors of the first three-dimensional objects 50 and 60 are connected to each other.

Figure 11:
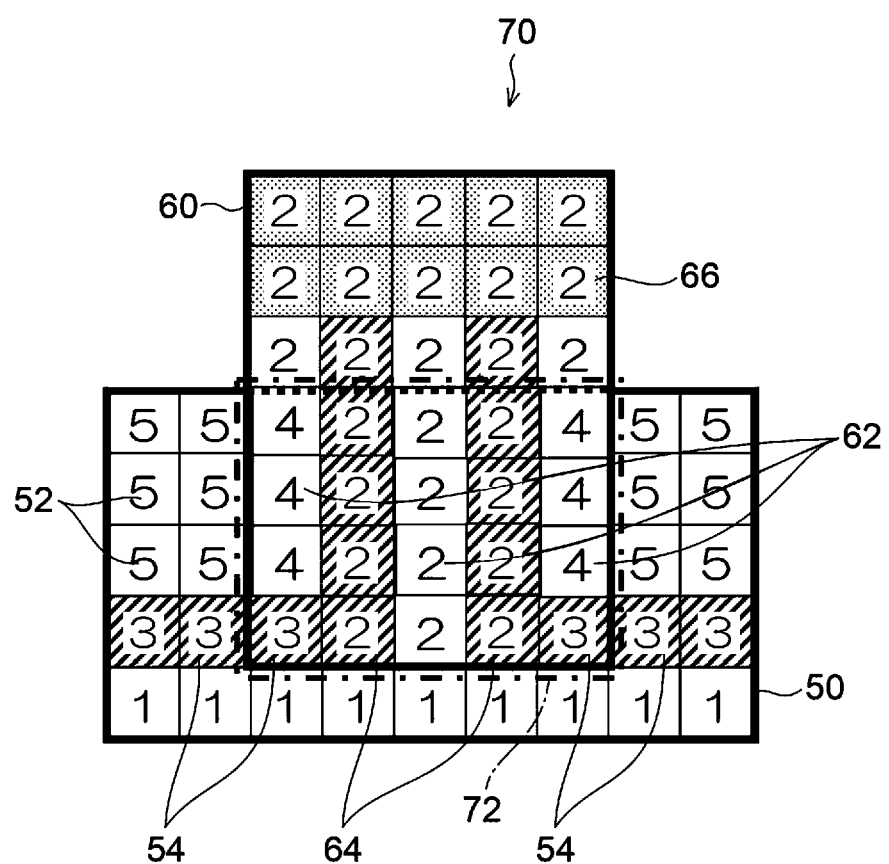
FIG. 11 is a diagram illustrating an example of priority levels set for the second three-dimensional object obtained by combining the plurality of first three-dimensional objects together.

In step S104, the first three-dimensional objects 50 and 60 in which the priority levels have been set in step S102 are combined together. For example, the user operates the operation unit 14 to combine the first three-dimensional objects 50 and 60 together such that, as illustrated in FIG. 11, the LED is inserted into the circuit board. As a result, the second three-dimensional object 70 is formed.

In step S106, attributes of voxels of the second three-dimensional object 70 obtained by combining the first three-dimensional objects 50 and 60 together are set in accordance with the priority levels for the first three-dimensional objects 50 and 60 set in step S102.

More specifically, as illustrated in FIG. 11, for voxels in an overlap 72 between the first three-dimensional objects 50 and 60, attributes of voxels whose priority levels are higher between the first three-dimensional objects 50 and 60 are set. For voxels of the first three-dimensional objects 50 and 60 outside the overlap 72, the attributes of the voxels are set as they are. As a result, as illustrated in FIG. 11, the attributes of the voxels in the overlap 72 are set such that two conductive ends of the LED are connected to the conductor of the circuit board. Voxel data regarding the second three-dimensional object 70 obtained by combining the first three-dimensional objects 50 and 60 together is thus generated in such a way as to be able to turn on the LED.

In step S108, the voxel data regarding the second three-dimensional object 70 generated in step S106 is stored in the storage unit 20.

The obtaining unit 110 of the three-dimensional object forming apparatus 100 obtains three-dimensional object data and support material data generated by the three-dimensional object data generation apparatus 10. The control unit 112 drives the discharge head driving unit 104 to move the discharge head 102 in two dimensions and controls the discharge of the object material and the support material performed by the discharge head 102 such that the object material and the support material are discharged in accordance with the three-dimensional object data and the support material data, respectively, obtained by the obtaining unit 110. As a result, the second three-dimensional object 70 obtained by combining the first three-dimensional objects 50 and 60 together is formed.

In the present exemplary embodiment, priority levels are set for the voxels of the first three-dimensional objects 50 and 60, and attributes of voxels of the second three-dimensional object 70 obtained by combining the first three-dimensional objects 50 and 60 together are set in accordance with the set priority levels. That is, the user is spared from setting the attributes of the voxels of the second three-dimensional object 70 one by one.

Although attributes of voxels whose priority levels are higher between the first three-dimensional objects 50 and 60 are set for the voxels in the overlap 72 between the first three-dimensional objects 50 and 60 in the present exemplary embodiment, a priority level set in the overlap 72 may be set for at least some voxels outside the overlap 72, instead.

Figure 12:
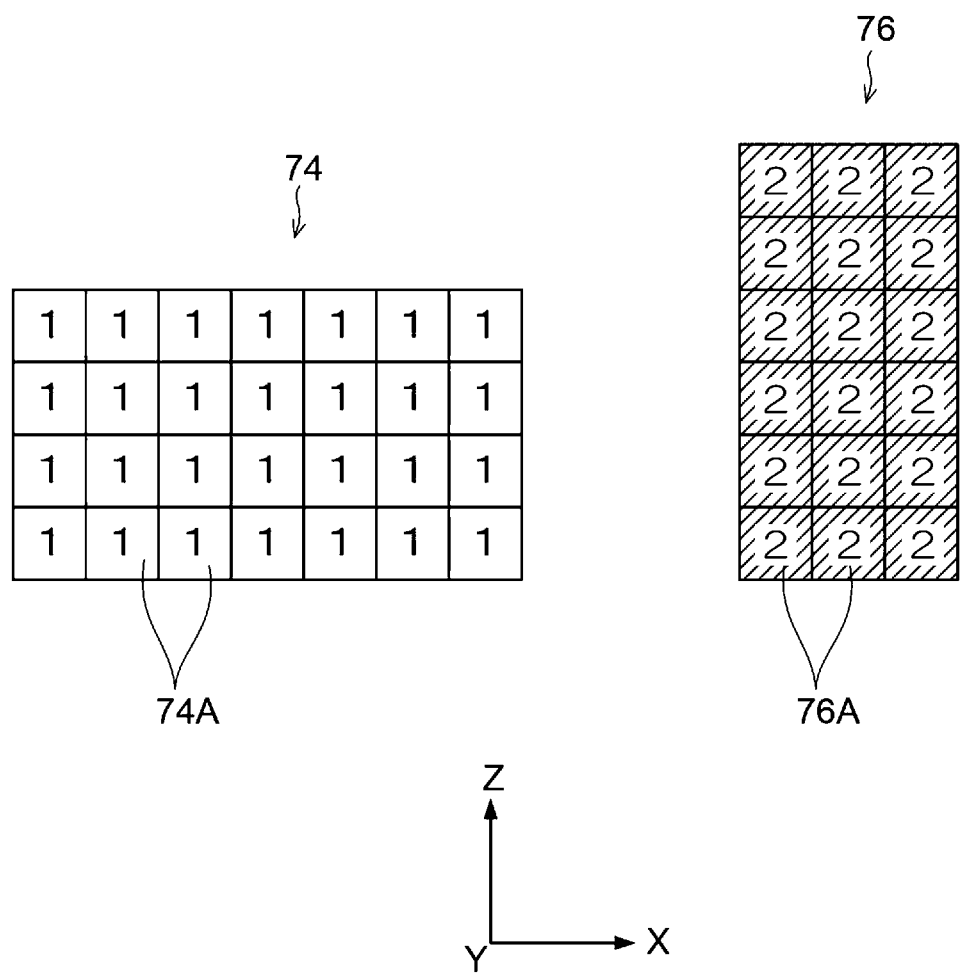
FIG. 12 is a diagram illustrating another example of the plurality of first three-dimensional objects.

As illustrated in FIG. 12, for example, intensity levels are set for voxels of first three-dimensional objects 74 and 76 as attributes before the first three-dimensional objects 74 and 76 are combined together. The intensity levels include "high", "moderate", and "low". The intensity level "high" is set for voxels 74A of the first three-dimensional object 74 as an attribute, and the intensity level "low" is set for voxels 76A of the first three-dimensional object 76 as an attribute. It is also assumed that the highest priority level of 1 is set for the voxels 74A of the first three-dimensional object 74, and the second highest priority level of 2 is set for the voxels 76A of the first three-dimensional object 76.

Figure 13:
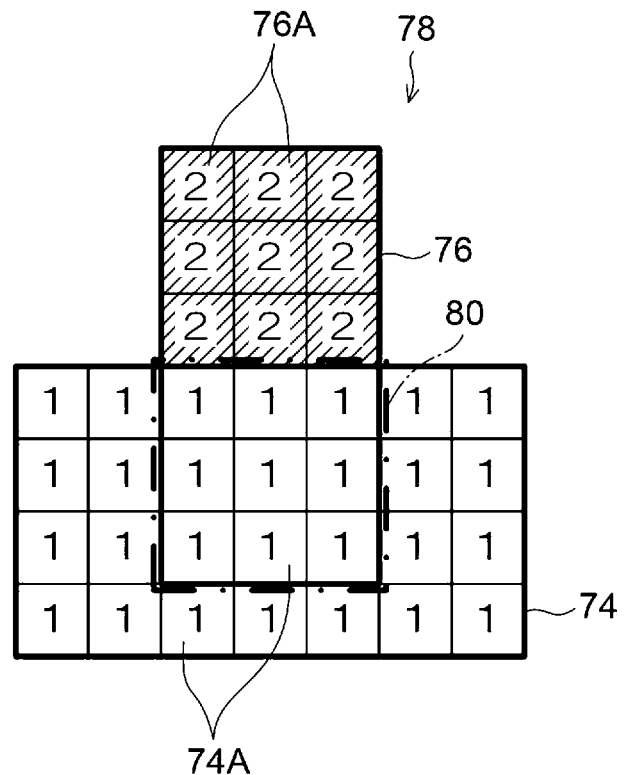
FIG. 13 is a diagram illustrating an example of priority levels set for a second three-dimensional object obtained by combining the plurality of first three-dimensional objects together.
Figure 14:
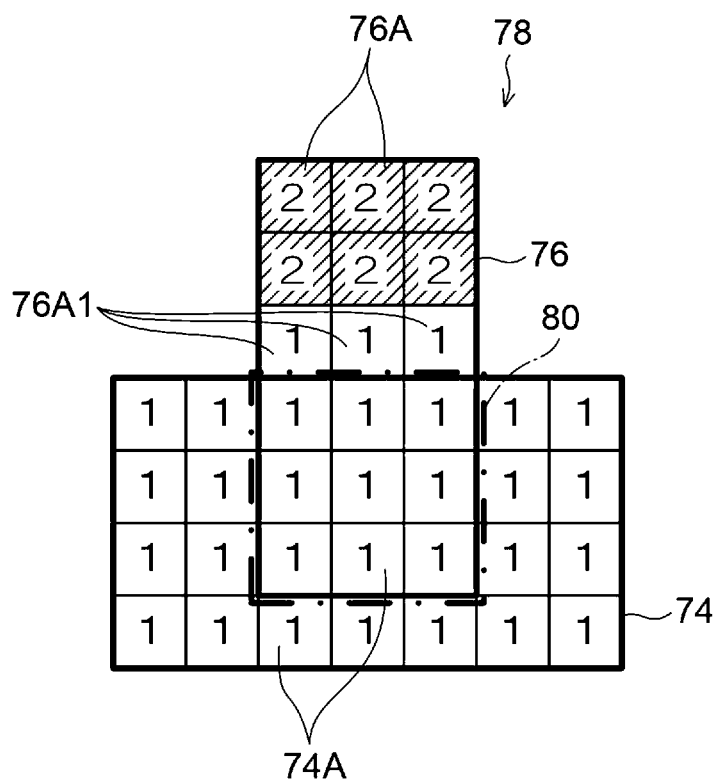
FIG. 14 is a diagram illustrating another example of the priority levels set for the second three-dimensional object obtained by combining the plurality of first three-dimensional objects together.

In this case, as illustrated in FIG. 13, a priority level of voxels in an overlap 80 between the first three-dimensional objects 74 and 76 becomes 1 in a second three-dimensional object 78 obtained by combining the first three-dimensional objects 74 and 76 together. Attributes of the voxels in the overlap 80 are accordingly set to "high", which has been set for the voxels 74A of the first three-dimensional object 74. Here, as illustrated in FIG. 14, the priority level of 1, which has been set for the voxels in the overlap 80, may also be set for some (voxels 76A1) of the voxels 76A of the first three-dimensional object 76 outside the overlap 80. As a result, attributes of the voxels 76A1 become the intensity level "high", which is the same as the attributes of the voxels in the overlap 80. Alternatively, the priority level of 1, which has been set for the voxels in the overlap 80, may be set for all the voxels 76A outside the overlap 80.

Figure 15:
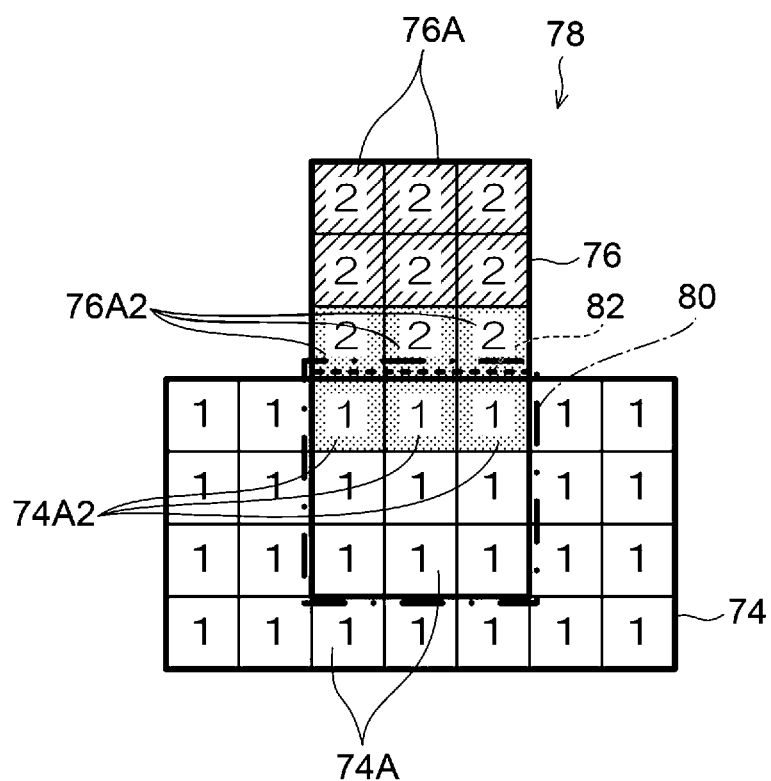
FIG. 15 is a diagram illustrating another example of the priority levels set for the second three-dimensional object obtained by combining the plurality of first three-dimensional objects together.

Alternatively, as illustrated in FIG. 15, for voxels located along a boundary 82 between the overlap 80 and the rest of the first three-dimensional object 76, namely voxels 74A2 and 76A2 facing each other across the boundary 82, for example, an intermediate attribute between attributes set for the voxels 74A2 and 76A2, that is, the intensity level "moderate", may be set.

A material having adhesiveness as an attribute may be set for voxels located along a boundary between the first three-dimensional objects 74 and 76 among the voxels in the overlap 80. As illustrated in FIG. 15, for example, a material having adhesiveness as an attribute may be set for either the voxels 74A2 or 76A2 in the overlap 80 located along the boundary 82 among the voxels.

If a first three-dimensional object includes a hollow part and virtual voxels are set in the hollow part, priority levels may be set for the virtual voxels.

Figure 16:
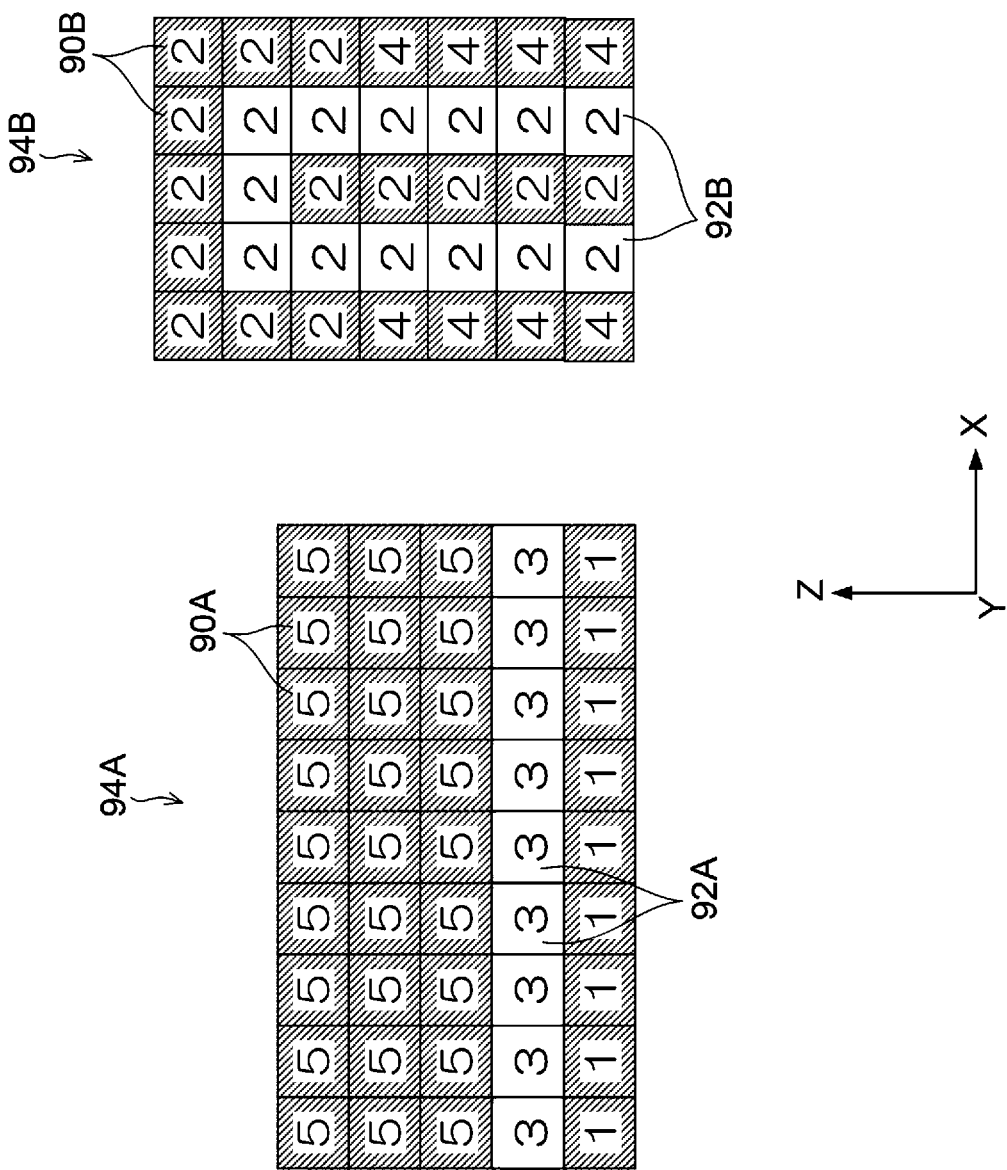
FIG. 16 is a diagram illustrating another example of the plurality of first three-dimensional objects.

A case will be described where a plurality of first three-dimensional objects including hollow parts are combined together to form a water pipe. As illustrated in FIG. 16, when a first three-dimensional object 94A including voxels 90A that form a water pipe and virtual voxels 92A set in a hollow part of the water pipe and a first three-dimensional object 94B including voxels 90B that form a water pipe and virtual voxels 92B set in a hollow part of the water pipe are combined together, priority levels are also set for the virtual voxels 92A and 92B. In the example illustrated in FIG. 16, the priority level of 3 is set for the virtual voxels 92A, and the priority level 2 is set for the virtual voxels 92B.

Figure 17:
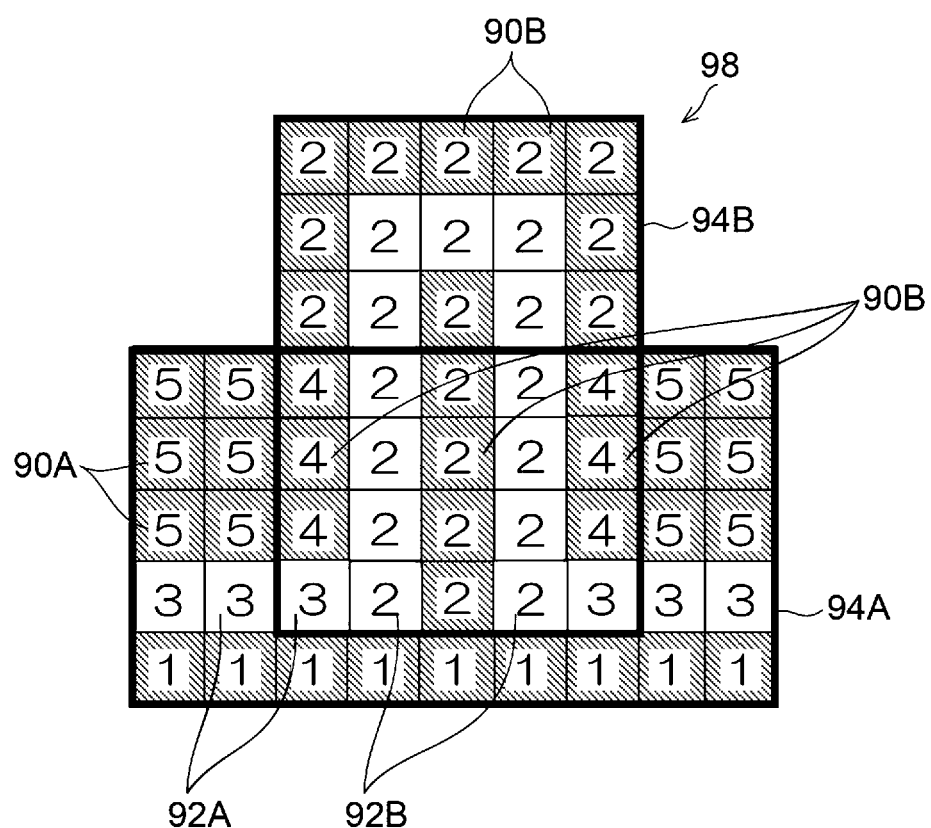
FIG. 17 is a diagram illustrating an example of priority levels set for a second three-dimensional object obtained by combining the plurality of first three-dimensional objects together.

As a result, as illustrated in FIG. 17, the hollow parts are connected to each other in a second three-dimensional object 98 obtained by combining the first three-dimensional objects 94 and 96 together, and water can pass through the second three-dimensional object 98.

Although the present disclosure has been described using an exemplary embodiment, the present disclosure is not limited to the above exemplary embodiment. The exemplary embodiment may be modified or improved in various ways without deviating from the scope of the present disclosure. The technical scope of the present disclosure also includes such modifications and improvements.

In the above exemplary embodiment, for example, only one attribute is set for each voxel for each type of attribute. For example, only one material is set for each voxel as an attribute. A plurality of attributes, however, may be set for each voxel for each type of attribute, instead. In this case, priority levels are set for the plurality of attributes of the same type, and a three-dimensional object is displayed on the display unit 16 or formed by the three-dimensional object forming apparatus 100 basically on the basis of an attribute having a higher priority level. The user, however, may issue an instruction such that, even after a plurality of first three-dimensional objects are combined together, a resultant three-dimensional object is displayed on the display unit 16 or formed by the three-dimensional object forming apparatus 100 on the basis of an attribute having a lower priority level, instead.

Although the user manually sets priority levels in the above exemplary embodiment, priority levels may be set automatically, instead. When priority levels are set automatically, the priority levels are set by automatically identifying necessary parts before or after first three-dimensional objects are combined together. As a result, it becomes easier for the user to set priority levels.

For example, the priority level setting unit 22 may automatically identify some (voxels 76A1) of the voxels 76A of the first three-dimensional object 76 outside the overlap 80 illustrated in FIG. 14. In this case, it is set to identify a predetermined number of layers of voxels at a contact of the first three-dimensional object 76, which forms a projection, so that the voxels at the contact are automatically identified. In FIG. 14, the priority level setting unit 22 automatically sets the priority level of 1, which has been set for the voxels in the overlap 80, as a priority level of the voxels 76A1 in one layer of the voxels 76A outside the overlap 80.

Alternatively, for example, the priority level setting unit 22 may automatically identify the voxels 74A2 and 76A2 facing each other across the boundary 82, which are voxels located along the boundary 82 between the overlap 80 and the rest of the first three-dimensional object 76 illustrated in FIG. 15. The attribute setting unit 24 may then automatically set an intermediate attribute between the attributes set for the voxels 74A2 and 76A2, that is, the intensity level "moderate".

When the first three-dimensional object 94A including the voxels 90A that form a water pipe and the virtual voxels 92A set in a hollow part of the water pipe and the first three-dimensional object 94B including the voxels 90B that form a water pipe and the virtual voxels 92B set in a hollow part of the water pipe are combined together as illustrated in FIG. 16, the virtual voxels 92A and 92B may be automatically identified, instead. In this case, the priority level of 3 may be automatically set for the voxels 92A and the priority level of 2 may be automatically set for the voxels 92B in accordance with predefined rules of priority levels on the basis of a direction in which the virtual voxels 92A and 92B are arranged or a shape of the virtual voxels 92A and 92B. If the shape of the virtual voxels 92A and 92B is a linear shape, for example, the priority level of 3 may be set, and if the shape of the virtual voxels 92A and 92B includes a bend, the priority level of 2 may be set in accordance with the rules. The priority level setting unit 22 may refer to the rules and set priority levels in accordance with the rules.

Although the three-dimensional object data generation apparatus 10 and the three-dimensional object forming apparatus 100 that forms a three-dimensional object on the basis of three-dimensional object data are separately provided in the above exemplary embodiment, the three-dimensional object forming apparatus 100 may have the function of the three-dimensional object data generation apparatus 10, instead.

That is, the obtaining unit 110 of the three-dimensional object forming apparatus 100 may obtain voxel data, and the control unit 112 may generate three-dimensional object data by performing the generation process illustrated in FIG. 6.

Alternatively, for example, the process for generating three-dimensional object data illustrated in FIG. 6 may be achieved by hardware such as an application-specific integrated circuit (ASIC). In this case, processing speed increases compared to when the process is achieved by software.

Although the program for generating three-dimensional object data is installed on the storage unit 20 in the above exemplary embodiment, the program need not be installed on the storage unit 20. The program according to the above exemplary embodiment may be provided in a computer readable storage medium, instead. For example, the program in the present disclosure may be provided in an optical disc such as a compact disc read-only memory (CD-ROM) or a digital versatile disc read-only memory (DVD-ROM) or a semiconductor memory such as a universal serial bus (USB) memory or a memory card. Alternatively, the program according to the above exemplary embodiment may be obtained from an external apparatus through a communication line connected to the communication unit 18.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A three-dimensional object data generation apparatus comprising:
    a processor programmed to function as:
        an attribute setting unit that sets, for each of a plurality of voxels representing a three-dimensional object, an attribute of a voxel of a second three-dimensional object, which is obtained by combining a plurality of first three-dimensional objects together, in accordance with a priority level set for an attribute of a voxel at a time when the plurality of first three-dimensional objects are combined together.

2. The three-dimensional object data generation apparatus according to claim 1,
    wherein the attribute setting unit sets an attribute having a higher priority level for a voxel in an overlap between the plurality of first three-dimensional objects.

3. The three-dimensional object data generation apparatus according to claim 2, wherein the processor is further programmed to function as:
    a first priority level setting unit that sets the priority level set in the overlap for at least one of voxels outside the overlap.

4. The three-dimensional object data generation apparatus according to claim 2,
    wherein the attribute setting unit sets, for a voxel located at a boundary between the overlap and a part other than the overlap, an intermediate attribute between attributes set for voxels facing each other across the boundary.

5. The three-dimensional object data generation apparatus according to claim 1, wherein the processor is further programmed to function as:
    a second priority level setting unit that sets the priority level for a virtual voxel set in a hollow part of the first three-dimensional objects.

6. The three-dimensional object data generation apparatus according to claim 1, wherein the attribute setting unit sets a material having adhesiveness as an attribute for a voxel located at a boundary between the plurality of first three-dimensional objects.

7. A three-dimensional object forming apparatus comprising:
   a forming unit that forms a three-dimensional object on a basis of three-dimensional object data generated by a three-dimensional object data generation apparatus, the three-dimensional object data generation apparatus comprising an attribute setting unit that sets, for each of a plurality of voxels representing a three-dimensional object, an attribute of a voxel of a second three-dimensional object, which is obtained by combining a plurality of first three-dimensional objects together, in accordance with a priority level set for an attribute of a voxel at a time when the plurality of first three-dimensional objects are combined together.

8. A non-transitory computer readable medium storing a program causing a computer to execute a process, the process comprising setting, for each of a plurality of voxels representing a three-dimensional object, an attribute of a voxel of a second three-dimensional object, which is obtained by combining a plurality of first three-dimensional objects together, in accordance with a priority level set for an attribute of a voxel at a time when the plurality of first three-dimensional objects are combined together.

* * * * *